TAPE-GUIDE ARRANGEMENT ON A DRUM FOR A VIDEO-RECORDER

Filed Nov. 29, 1967

INVENTOR.
VIKTOR POLLASCHEK
BY
AGENT

United States Patent Office 3,495,753
Patented Feb. 17, 1970

3,495,753

TAPE-GUIDE ARRANGEMENT ON A DRUM FOR A VIDEO-RECORDER

Viktor Pollaschek, Vienna, Austria, assignor to U.S. Philips Corporation, New York, N.Y., a corporation of Delaware Filed Nov. 29, 1967, Ser. No. 686,583
Claims priority, application Austria, Dec. 29, 1966, A 11,965/66
Int. Cl. G11b *15/60*
U.S. Cl. 226—198 9 Claims

ABSTRACT OF THE DISCLOSURE

A guide drum for a tape carrier having a resilient guide element attached to the drum. A hook portion of the guide element is engaged against a recessed surface of the drum and projects beyond the drum surface to laterally guide the tape.

The invention relates to a guide drum for a tape shaped record carrier used with apparatus for recording and/or playing back signals, particularly with wide frequency spectrum. For the lateral guiding of such record carriers which are helically wound on a bearing surface of the drum, hook-like guide elements are secured on the surface of the drum outside the path of the record carrier with one end of the hook portion guiding the record carrier and extending into a recess provided relative to the bearing surface. This type of drum is used in recording and/or playback apparatus for video information. Since the tracks to be recorded in such apparatus on the record carrier are usually very narrow and form lines which extend closely beside each other and obliquely on the record carrier, the travel of the record carrier on the surface of the drum is of particular importance during the time the recording or playback occurs. It is thus necessary to provide guide elements which are distributed on the circumference of the drum and laterally guide the record carrier.

In a known apparatus of the type mentioned the guide elements are bent in the form of a hook, their ends projecting along the surface of the drum and they are secured to the surface of the drum outside the path of the record carrier. The opposite ends extend into recesses which are provided in the surface of the drum and form lateral guides. The recesses extend substantially at right angles to the path of the record carrier. The adjustment of the correct position of these guide elements requires a special skill. Therefore, such guide elements can be arranged or exchanged only by skilled personnel.

The invention provides a particularly simple solution for arranging the guide elements on the surface on the drum, requiring no involved mounting procedures and simplifying the replacement of defective guide elements.

The invention is characterized in that the recess comprises a wall face extending immediately beside the lateral boundary of the path of the record carrier, the line of intersection of said wall face with the bearing surface extending in the lateral boundary of the path of the record carrier. The guide elements are constructed so as to be resilient at the area of their hook-like bend, so that the ends of the hook portions guiding the record carrier can resiliently engage said wall face of the recess. In this manner the position of the guide elements which determine the path of the record carrier are dependent only on the wall face of the recess. Once manufactured the elements can be arranged or exchanged without further measures, since every guide element will always automatically engage the said wall face and accurately assume the same position as any other.

The wall face of the recess may be constructed in various manners. For example, it may enclose an acute angle or an obtuse angle with the bearing surface. Preferably the wall face of the recess is constructed so as to extend at right angles to the bearing surface. The wall face of the recess is preferably provided in the surface of the drum throughout the length of the bearing surface. In this case the bearing surface may be formed by a part which is raised with respect to the remaining surface of the drum or by a ring which is laterally turned. It is particularly favourable from a point of view of manufacture that the wall face be by a side surface of a groove in the surface of the drum provided immediately beside the lateral boundary of the path of the record carrier.

Guide elements also may be constructed in various manners. If a recess in the form of a groove is used, at least one lug is provided on the hook portion of the guide elements to secure the element to the surface of the drum, which lug likewise extends in the groove and engages the side face of the groove situated opposite to the wall face nearest to the bearing surface. As a result mounting can be particularly simple since the guide elements, as soon as they are inserted into the groove, are self-locking. They are then fixed in the desired position. For the correct engagement of the guide elements to the wall face of the recess it has proved particularly favourable if the hook portion of the guide elements guiding the record carrier has a flat surface on the side facing the wall face. Very effective guide elements are obtained when they are bent from a strip of sheet resilient material. Preferably, the hook portion of the guide elements to be secured to the surface of the drum has a resilient projection bent in the direction of the surface of the drum.

In order that the invention may be readily carried into effect, a few embodiments thereof will now be described in greater detail, by way of example, with reference to the accompanying drawings, in which.

FIGURE 5 again shows a cross-sectional view, and

Figure 6:
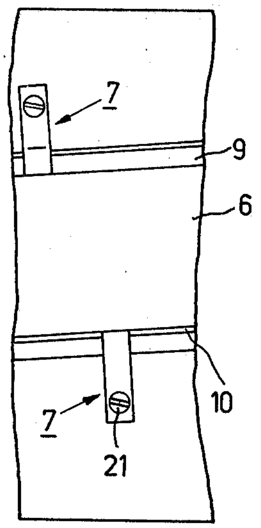

FIGURE 6 a side elevation of a drum having a recess in the form of a groove throughout the length of the bearing surface the wall face being inclined relative to the bearing surface.

Figures 1, 2, 4:
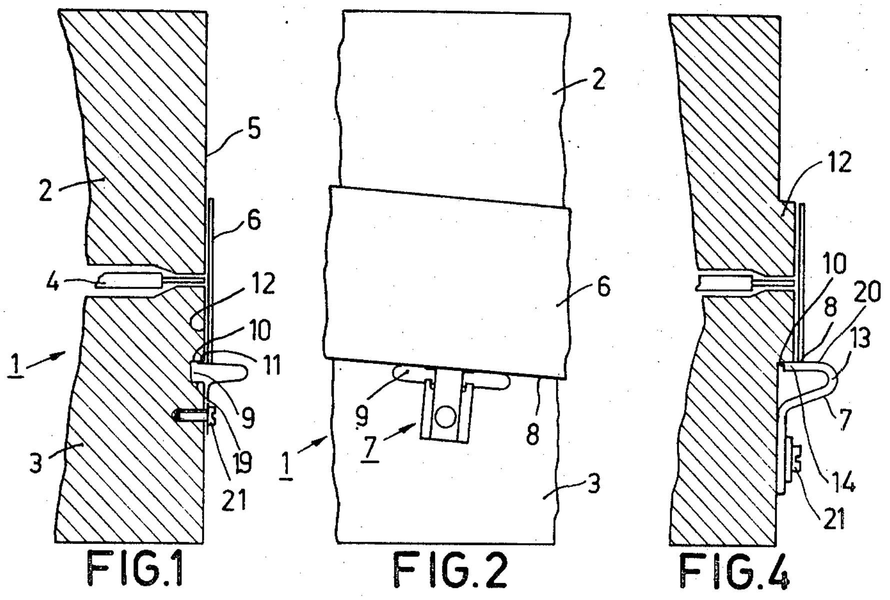
FIGURE 1 is a cross-sectional view and FIGURE 2 a side elevation of a drum in which the recess for each guide element is formed by the part of a groove.
FIGURE 4 shows a drum in which the wall face of the recess is obtained in that laterally of the bearing surface of the record carrier the drum is recessed.

In FIGURES 1 and 2, reference numeral 1 denotes a drum between the drum half 2 and 3 of which the rotating recording and/or playback heads 4 are arranged. On the surface 5 of the drum a record carrier 6 is helically wound. The path of the record carrier is determined by guide elements 7 which are arranged along a lateral boundary 8. The position of each guide element is determined by a recess 9, which comprises a wall face 10, as will be explained below.

A number of recesses 9 corresponding to the number of guide elements 7 to be provided are arranged in the wall of the drum and have a wall face 10 extending immediately beside or adjacent the lateral boundary 8 of the path of the record carrier. The line of intersection 11 of the wall face 10 with the bearing surface 12 of the record carrier coincides with the lateral boundary 8 of the path of the record carrier. Each of these recesses is in the form of a groove and is obtained, for example, by milling in the surface of the drum by means of a milling-cutter. The wall face extends at right angles to the bearing surface 12.

Figure 3:
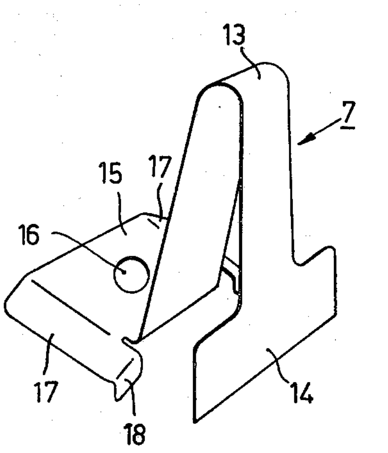
FIGURE 3 is a cross-sectional view in detail of a guide element as shown in FIGURES 1 and 2.

As shown in FIGURE 3 the guide elements 7 are constructed in the form of hooks. At the area of the hook-like bend 13 they are flexible, since the guide elements are bent from a sheet of resilient material. The hook portion 14 adapted for guiding the record carrier and cooperating with the wall face 10 has a flat construction. The other hook portion 15 has an aperture 16 for securing it to the surface of the drum by means of a screw 21. To ensure a reliable engagement of said portion 15 to the surface of the drum, resilient projections 17 are bent in the direction of the surface of the drum. Each of the said projections 17 further comprises a lug 18 bent at right angles which engages the side surface 19 of the recess 9 opposite to the wall face 10. Of course, the lug 18 may also be provided directly on the portion 15.

Mounting of the guide elements to the drum is accomplished by bending and holding against the spring action the hook portion 14, then inserting the guide element in the recess so that the end 14 is situated on the side of the wall face 10 of the recess and the lugs 18 are situated near the side face 19. Then the guide element is released so that it springs. The portion 14 engages the wall face 10 and the lugs 18 engage the side face 19. In this position the guide element holds itself in place. By means of a screw 21 it may be secured to the surface of the drum. Since the end of the hook portion 14 directly engages the wall face 10 of the recess, the hook portion 14 projecting from the surface of the drum constitutes an immediate elongation of said wall face. As the wall face extends along the lateral boundary 8 of the path of the record carrier, the hook portion 14 also is automatically arranged along said boundary. It therefore immediately assumes the position which it should have for the correct guiding of the record carrier. As may be seen, mounting of the guide elements requires no adjustments at all. In addition, while fixing the guide elements to the drum no undesired position variation can occur since the hook portions 14 always engage the wall faces under spring action. Therefore the accuracy of the guiding of the record carrier is solely determined by the direction of the wall face 10 of the recess 9 which may be controlled with a high degree of accuracy during the manufacture of the drum. A further advantage is that defective guide elements, as a matter of fact said elements are subject to high detrition by the sharp edge of the record carrier usually running at high speed, can be replaced by new ones without any adjustment.

As shown in FIGURE 4 the wall face 10 of the recess can be formed so that the drum is recessed laterally of the boundary 8 of the path of the record carrier and a raised bearing surface 12 is formed. As guide elements 7 are wire pins bent in the form of a hook which are resilient in the area of their hook-like bend 13. The end of the hook portion 14 serving for guiding the record carrier has a partially ground surface 20 with the hook portion engaging the wall face 10. This surface 20 also guides the record carrier. Mounting of said guide elements is accomplished by pushing the wire pins against the wall face 10 so that the end 14 moves backwards somewhat, then the wire pin is secured to the drum by means of a screw 21. For guiding the wire pins along the surface of the drum wedge-like grooves may be provided.

Figure 5:
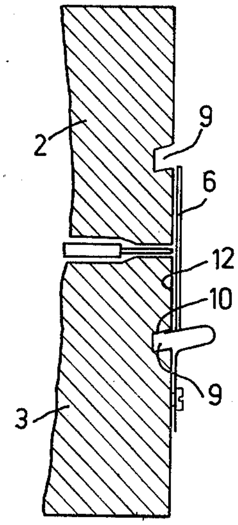

FIGURES 5 and 6 shows a drum in which the record carrier is guided on both sides. A continuous groove serves as a recess 9. The wall face 10 of each recess is inclined relative to the bearing surface 12 at an angle deviating from 90°. Such a variation is automatically obtained if the grooves are milled in the surface of the drum with a side milling cutter. Resilient strips of sheet metal simply bent in the form of a hook serve as guide elements in an analogous manner. Such an arrangement has the advantage that the guide elements 7 form an upwardly directed channel for inserting the record carrier so that the record carrier can easily be wound around the dum without tension and without it sliding downwads again from the guide element.

A number of variations of the above examples, are possible without departing from the scope of this invention. For example, such guides of the record carrier may be used with drums of varying types, for example, with alpha, omega or only with 180° winding of the record carrier around the drum, or the guide elements themselves may be constructed in different manners, or be secured to the drum.

What is claimed is:

1. A guide drum for a tape shaped record carrier in apparatus for recording and/or playing back signals, particularly with wide frequency spectrum in which, for the lateral guiding of the record carrier to be wound helically on a bearing surface of the drum, at least one side of the path of said record carrier hook-like guide elements are arranged of which each has one hook portion secured to the surface of the drum outside the path of the record carrier and the end of the other hook portion guiding the record carrier extends in a recess provided relative to the bearing surface, characterized in that the recess comprises a wall face extending immediately beside the lateral boundary of the path of the record carrier, the line of intersection of said wall face with the bearing surface extending in the lateral boundary of the path of the record carrier, the guide elements being constructed so as to be resilient at the area of their hook-like bend, the ends of the hook portions guiding the record carrier thereby engaging said wall face of the recess.

2. A drum as claimed in caim 1 characterized in that the wall face of the recess is constructed so as to extend at right angels to the bearing surface.

3. A drum as claimed in claim 1 wherein the wall face of the recess is provided in the surface of the drum throughout the length of the bearing surface.

4. A drum as claimed in claim 1, wherein the wall face is formed by a side surface of a groove in the surface of the drum provided immediately beside the lateral boundary of the path of the record carrier.

5. A drum as claimed in claim 4 wherein the hook portion of the guide elements to be secured to the surface of the drum has at least one lug provided which extends in the groove and engages the side face of the groove situated opposite to the wall face nearest to the bearing surface.

6. A drum as claimed in claim 5 wherein the hook portion of the guide elements guiding the record carrier has a flat surface on the side facing the wall face.

7. A drum as claimed in claim 6, wherein the guide elements are bent from a strip of sheet resilient material.

8. A drum as claimed in claim 7, wherein the hook portion of the guide elements to be secured to the surface of the drum comprises, at least on one side a resilient projection which is bent in the direction of the surface of the drum.

9. A guide drum for a tape record carrier comprising a drum having a cylindrical bearing surface for supporting the record carrier, a recess defined in the drum adjacent the bearing surface, said recess having a wall face which intersects said bearing surface, a resilient guide element secured at one end to the drum, hook means at the opposite end of the guide element adapted to be inserted into the recess and to engage by spring action, the wall face of the recess and to project beyond the bearing surface to guide the lateral edge of the record carrier.

References Cited

UNITED STATES PATENTS

| | | | |
|---|---|---|---|
| 3,123,272 | 3/1964 | Pollaschek | 226—199 X |
| 3,261,525 | 7/1966 | De Lange | 226—199 |

ALLEN N. KNOWLES, Primary Examiner